Aug. 13, 1963  L. J. BOLER ETAL  3,100,495
VIBRATION RESISTANT ACCELERATION ACTIVATED VALVE
Filed Nov. 21, 1960
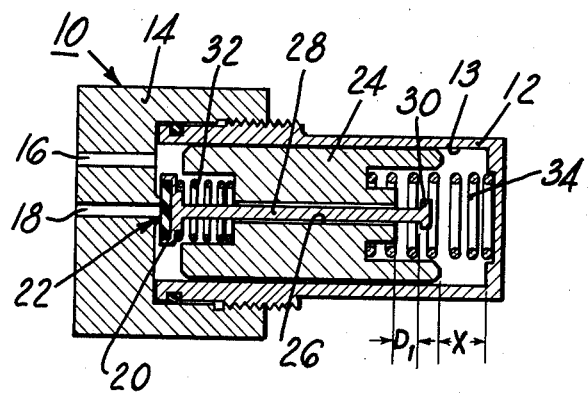
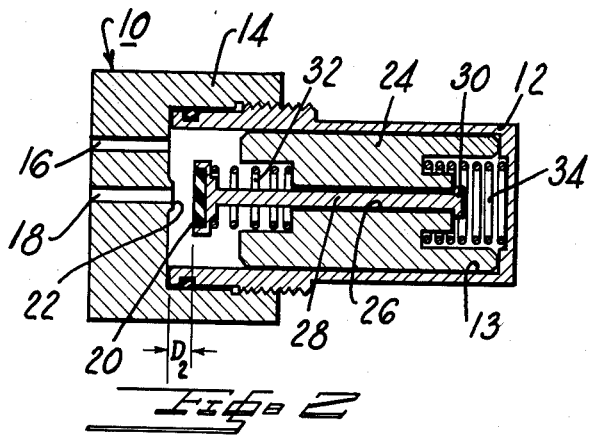
LEONARD J. BOLER
HOWARD L. McCLELLAND
INVENTORS
BY William N. Antonis
ATTORNEY

United States Patent Office 3,100,495
Patented Aug. 13, 1963

3,100,495
VIBRATION RESISTANT ACCELERATION ACTIVATED VALVE
Leonard J. Boler and Howard L. McClelland, Mishawaka, Ind., assignors to The Bendix Corporation, Mishawaka, Ind., a corporation of Delaware
Filed Nov. 21, 1960, Ser. No. 70,774
4 Claims. (Cl. 137—38)

This invention relates to valves and more particularly to a vibration resistant acceleration activated valve.

Such a valve may be used in any of many control applications wherein flow through a fluid circuit needs to be controlled as a function of predetermined acceleration force levels.

In most aircraft and missile applications it is known that during given intervals of time, such as during boost phase, sharp maneuvers, etc., certain predictable sustained acceleration forces will occur. However, during other intervals of time, intermittent acceleration forces of the same magnitude can and oftentimes do arise because of various vibrations and shocks.

Many of the acceleration activated valves presently in use are unable to differentiate between sustained acceleration forces and intermittent acceleration forces and will become activated when either type of acceleration forces arises, so long as it is of a given magnitude. Such insensitiveness is highly undesirable, since such valves must normally be activated only as a function of a known sustained acceleration force.

Accordingly, it is an object of this invention to provide an acceleration activated valve which will be activated only by sustained acceleration forces of predetermined magnitudes and will be insensitive to intermittent acceleration forces equal to or greater than said predetermined magnitudes resulting from vibrations and/or shocks.

More particularly, it is an object of this invention to provide a vibration resistant acceleration activated valve which includes a movable acceleration weight operatively connected to a valve member for moving the valve member from a closed position to an open position when predetermined sustained acceleration forces are exerted thereagainst, said valve member being moved to an open position only after the acceleration weight has moved a predetermined distance.

The above and other objects and features of the invention will be apparent from the following description of the device taken in connection with the accompanying drawing which forms a part of this specification and in which:

FIGURE 1 is a sectional view of our valve in a closed position; and

FIGURE 2 is a sectional view of our valve in an open position.

Referring to FIGURES 1 and 2 of the drawing, it will be seen that numeral 10 designates a vibration resistant acceleration activated valve which, under predetermined conditions, will permit or prevent flow through a fluid circuit. More particularly, the valve 10 includes a cylindrical housing 12 having a bore 13 therein which is closed at one end and an endcap 14 which is threaded onto the open end of the cylindrical housing 12. Located in endcap 14 is a first passage 16 which communicates with a high pressure source (not shown) and a second passage 18 which communicates with a low pressure source (not shown). Located in bore 13 is a valve member 20 which is seatable on valve seat 22 formed at one end of passage 18. Also located in bore 13 is an acceleration weight 24 having a central bore 26 extending therethrough. A rod 28 extends through said central bore 26 and has one end thereof fixedly connected to the valve member 20 and the other end thereof formed into a flange-like stop 30. A first spring 32 is located between the valve member 20 and the acceleration weight 24 for urging the valve member against valve seat 22, while a second spring 34 is located between the weight 24 and the closed end of cylindrical housing 12 for resisting movement of the weight.

Operation of the valve is as follows:

At a predetermined increase above a set sustained acceleration level, the weight 24 will move a distance $D_1$, as shown in FIGURE 1, at which time contact is made with the stop 30. As the sustained acceleration forces continue to increase, the weight 24 will continue to move and thus cause the valve member 20 to move away from the valve seat 22. After the weight 24 contacts the stop 30, the valve member 20, weight 24 and spring 20 will move as a unit until the weight bottoms as shown in FIGURE 2. Since total movement of the weight equals a distance X, as shown in FIGURE 1, it necessarily follows that the valve member 20 will be displaced a distance $D_2$, as shown in FIGURE 2, said latter distance being equal to $X-D_1$.

Thus, under various vibratory conditions the weight 24 is free to move a distance $D_1$ without unseating the valve member 20. In this connection it should be understood that the mass of the valve member 20 is small in comparison to the mass of the weight 24 and that the force exerted by the spring 32 is large in comparison to the mass of the valve member. Therefore, acceleration forces of a magnitude equal to or greater than the predetermined acceleration levels for which the valve is designed will not unseat valve member 20 when these acceleration forces are intermittent, and would result from vibrations and shocks. The distance $D_1$ will determine the vibration frequencies which will be negated.

The several practical advantages which flow from our invention are believed to be obvious from the above, and other advantages may suggest themselves to those who are familiar with the art to which this invention relates.

Having thus described the various features of the invention, what we claim as new and desire to secure by Letters Patent is:

1. A vibration resistant acceleration activated valve comprising a housing having a bore therein, first and second passages communicating with said bore, one of said passages communicating with a high pressure source and the other of said passages communicating with a low pressure source, a valve seat formed at one end of one of said passages, a valve member seatable on said valve seat and having a rod extending therefrom with a stop at the end thereof, means for urging said valve member against said valve seat, an acceleration weight operatively connected to said valve member and movable in said bore for unseating said valve member from said valve seat after contacting said stop to thereby permit communication between said first and second passages, said acceleration weight being positioned so that contact with said stop will occur only after predetermined sustained acceleration forces cause said weight to move a predetermined distance, and means for resisting movement of said weight.

2. A vibration resistant acceleration activated valve comprising a housing having a bore therein, a high pressure passage and a low pressure passage communicating with said bore, a valve seat formed at one end of said low pressure passage, a valve member seatable on said valve seat and having a rod extending therefrom with a stop at the end thereof, resilient means for urging said valve member against said valve seat, an acceleration weight operatively connected to said valve member and slidable in said bore for unseating said valve member from said valve seat after contacting said stop to thereby permit communication between said high and low pressure passages, said acceleration weight being positioned so that contact with said stop will occur only after predetermined sustained acceleration forces cause said weight to move a predetermined distance, and resilient means for opposing movement of said weight.

3. A vibration resistant acceleration activated valve comprising a housing having a bore therein, first and second passages communicating with said bore, one of said passages communicating with a high pressure source and the other of said passages communicating with a low pressure source, a valve seat formed at one end of one of said passages, a valve member seatable on said valve seat, a rod operatively connected to said valve member and having a stop formed on the end thereof, an acceleration weight operatively connected to said valve member and slidable in said bore for unseating said valve member from said valve seat after moving relative to said rod and contacting said stop to thereby permit communication between said first and second passages, said acceleration weight being positioned a predetermined distance away from said stop so that contact with said stop will occur only after predetermined sustained acceleration forces cause said weight to move said predetermined distance, spring means located between said weight and said housing for resisting movement of said weight, and spring means located between said valve member and said weight for urging said valve member against said valve seat.

4. A vibration resistant acceleration activated valve as defined in claim 3 wherein the valve seat is formed at one end of the passage communicating with the low pressure source.

References Cited in the file of this patent

UNITED STATES PATENTS

| | | |
|---|---|---|
| 2,622,394 | Murdock | Dec. 25, 1952 |
| 2,627,718 | Edelfelt | Feb. 10, 1953 |
| 2,918,072 | Boler | Dec. 22, 1959 |
| 2,943,685 | Sargent | July 5, 1960 |

FOREIGN PATENTS

| | | |
|---|---|---|
| 604,304 | Great Britain | July 1, 1948 |
| 1,061,624 | Germany | July 16, 1959 |